(12) United States Patent
Gupta et al.

(10) Patent No.: US 11,653,323 B2
(45) Date of Patent: May 16, 2023

(54) METHOD AND APPARATUS FOR PROVIDING SERVICE TO EDGE APPLICATION SERVER (EAS) IN EDGE DATA NETWORK (EDN)

(71) Applicant: Samsung Electronics Co., Ltd., Suwon-si (KR)

(72) Inventors: Nishant Gupta, Bangalore (IN); Basavaraj Jayawant Pattan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/450,056

(22) Filed: Oct. 5, 2021

(65) Prior Publication Data
US 2022/0110081 A1    Apr. 7, 2022

(30) Foreign Application Priority Data

Oct. 5, 2020   (IN) .............................. 202041043261
Sep. 16, 2021  (IN) .............................. 202041043261

(51) Int. Cl.
*H04W 60/04*      (2009.01)
*H04W 12/71*      (2021.01)
(Continued)

(52) U.S. Cl.
CPC ......... *H04W 60/04* (2013.01); *H04W 12/068* (2021.01); *H04W 12/48* (2021.01); *H04W 12/71* (2021.01)

(58) Field of Classification Search
CPC ... H04W 12/068; H04W 12/48; H04W 12/71; H04W 60/04; H04W 88/182; H04L 67/1095; H04L 67/2861
See application file for complete search history.

(56) References Cited

U.S. PATENT DOCUMENTS

2020/0178198 A1*  6/2020  Ding .................... H04W 60/04
2020/0228630 A1   7/2020  Guim Bernat et al.
(Continued)

FOREIGN PATENT DOCUMENTS

| WO | 2020013677 A1 | 1/2020 |
| WO | 2020063179 A1 | 4/2020 |
| WO | 2020197288 A1 | 10/2020 |

OTHER PUBLICATIONS

International Search Report and Written Opinion of the International Searching Authority in connection with International Application No. PCT/KR2021/013603 dated Jan. 6, 2022, 6 pages.
(Continued)

*Primary Examiner* — Liton Miah

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Accordingly, embodiments herein disclose a method for providing service(s) to an edge application server (EAS) in an edge data network (EDN). The method includes receiving, by an EES, an EAS usage indication from an edge enabler client (EEC) of a user equipment (UE), where the EAS usage indication comprises at least one parameter.

14 Claims, 7 Drawing Sheets

(51) Int. Cl.
*H04W 12/06* (2021.01)
*H04W 12/48* (2021.01)

(56) References Cited

U.S. PATENT DOCUMENTS

| | | | | |
|---|---|---|---|---|
| 2021/0111953 | A1* | 4/2021 | Hall | H04L 41/0806 |
| 2021/0112438 | A1* | 4/2021 | Soloway | H04L 43/08 |
| 2021/0136177 | A1* | 5/2021 | Hall | H04L 67/59 |
| 2021/0136775 | A1* | 5/2021 | Soloway | H04W 72/08 |
| 2021/0337043 | A1* | 10/2021 | Hall | H04W 88/182 |
| 2021/0352113 | A1* | 11/2021 | Sodagar | H04W 4/20 |
| 2022/0014799 | A1* | 1/2022 | Sodagar | H04N 21/6156 |
| 2022/0015018 | A1* | 1/2022 | Kim | H04W 48/08 |

OTHER PUBLICATIONS

3GPP TS 23.558 V1.0.0 (Sep. 2020) Technical Specification, 3rd Generation Partnership Project; Technical Specification Group Services and System Aspects; Architecture for enabling Edge Applications; (Release 17), Sep. 2020, 103 pages.

3GPP TR 23.748 V1.0.0 (Sep. 2020) Technical Report; 3rd Generation Partnership Project; Technical Specification Group Services and System Aspects; Study on enhancement of support for Edge Computing in 5G Core network (5GC) (Release 17), Sep. 2020, 232 pages.

Intellectual Property India, "Examination report under sections 12 &13 of the Patents Act" dated May 31, 2022, in connection with Indian Patent Application No. 202041043261, 6 pages.

Samsung, "Application context relocation initiated by EEC", 3GPP TSG-SA WG6 Meeting #38-e, Jul. 20-31, 2020, S6-201055, 4 pages.

Supplementary European Search Report dated Oct. 5, 2022 in connection with European Patent Application No. 21 87 0559, 8 pages.

* cited by examiner

METHOD AND APPARATUS FOR PROVIDING SERVICE TO EDGE APPLICATION SERVER (EAS) IN EDGE DATA NETWORK (EDN)

CROSS-REFERENCE TO RELATED APPLICATIONS

This application is based on and claims priority under 35 U.S.C. § 119 to Indian Provisional Patent Application No. 202041043261, filed on Oct. 5, 2020, and Indian Complete Patent Application No. 202041043261 filed on Sep. 16, 2021, in the Indian Intellectual Property Office, the disclosures of which are herein incorporated by reference in its entirety.

BACKGROUND

1. Field

The present disclosure relates to an edge computing, and more specifically related to a method and apparatus for providing service(s) to an edge application server (EAS) in an edge data network (EDN).

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In general, edge computing systems provide an environment in which an application(s) can be hosted close to application consumer(s) for providing benefits of high availability and low latency. A detailed architecture explained in existing 3GPP technical specification (TS) 23.558 is shown in FIG. 1. In 3GPP edge, the application(s) are hosted in edge data networks (EDN) (10) and the application(s) are referred to as edge application server(s) (EAS) (11). The EASs (11) is assisted by edge enabler server(s) (EES) (12) collocated with the EASs (11) in the EDN (10). Assistance provided by the EES (12) includes monitoring of a user equipment (UE) (20), providing self and capability of core-network (30) exposure to the EAS (11), assisting in application context relocation, etc.

The application consumer(s) of the EAS (11) known as an application client(s) (AC) (21), which resides on the UE (20) and are assisted by an edge enabler client (EEC) (22) on the UE (20). Multiple EAS (11) for the same application may be accessible on various EDNs at any one moment, ready to offer service to UE (20). An edge configuration servers (ECS) (13) and the EES (12) assists the UE (20) in finding these EAS (11). With the help of the AC (21), the EEC (22) then selects one of the available EAS (for example, selects EAS (11a) of the EASs (11)) and facilitates establishment of communication between the AC (21) and the selected EAS (11a).

Currently, there is no mechanism for the EES (12) to determine which EAS was chosen by the EEC (22). This makes it difficult for the EES (12) to provide services to their EAS (11). Because the EES (12) does not know if the EEC (22) chose the EAS (11) registered with the EES (12), the EES (12) cannot decide whether the EES (12) needs to reserve resources and make appropriate arrangements (such as subscribing for 3GPP core network capabilities or monitor UE for application context relocation (ACR) support) to provide support to the EAS (11). Thus, it is desired to provide a useful alternative for informing the EES (12) regarding usage of the EAS (11).

The principal object of the embodiments herein is to receive, by edge enabler server(s) (EES) of an Edge Data Network (EDN), an Edge Application server(s) (EAS) usage indication from an Edge Enabler Client (EEC) of a User Equipment (UE) and/or an EAS. The EES then reserves resources and makes appropriate arrangements (e.g., subscribing for CN capabilities or monitor UE for ACR) to provide support to the EAS based on the EAS usage indication. As a result, the resources are optimally utilized in an edge data network (EDN).

Another object of the embodiment herein is to store a plurality of parameters (e.g., an identifier of the EEC (EECID), security credentials of the EEC, an identifier of the UE (UE ID), a source Internet Protocol (IP) address of the UE, etc.) associated with the EAS usage indication in the EES when credentials of the EEC and/or the EAS and/or a source EES are valid.

SUMMARY

Accordingly, an aspect of the disclosure there is to provide a method for a method for providing at least one service to an Edge Application Server (EAS) in an Edge Data Network (EDN), the method comprises: receiving, by an Edge Enabler Server (EES), an EAS usage indication from an Edge Enabler Client (EEC) of a User Equipment (UE), wherein the EAS usage indication comprises at least one parameter; identifying, by the EES, the at least one parameter; and providing, by the EES, the at least one service to the EAS based on the at least one parameter.

Another aspect of the disclosure is to provide an Edge Enabler Server (EES) providing at least one service to an Edge Application Server (EAS) in an Edge Data Network (EDN), the EES comprising: a memory; a processor; and a controller, operably connected to the memory and the processor, configured to: receive an EAS usage indication from an Edge Enabler Client (EEC) of a User Equipment (UE), wherein the EAS usage indication comprises at least one parameter; identify the at least one parameter; and provide the at least one service to the EAS based on the at least one parameter.

Accordingly, embodiments herein disclose a method for providing service(s) to an edge application server (EAS) in an edge data network (EDN). The method includes receiving, by an edge enabler server (EES), an EAS usage indication from an edge enabler client (EEC) of a user equipment (UE), where the EAS usage indication comprises a plurality of parameters. Further, the method includes determining, by the EES, whether credentials of the EEC are valid. Further, the method includes storing, by the EES, the plurality of parameters in response to determining that the credentials of the EEC are valid. Further, the method includes providing, by the EES, the service(s) to the EAS based on the stored plurality of parameters.

In an example embodiment, the plurality of parameters includes an identifier of the EEC (EECID), security credentials of the EEC, an identifier of the UE (UE ID), or a list of EAS identifiers (EASIDs) that are being used by an application client (AC) of the UE.

In an example embodiment, the method includes determining, by the EEC, a plurality of EASs in the EDN by using an edge configuration server (ECS) and the EES. Further, the method includes selecting, by the EEC, one of an EAS from the plurality of EASs to send the EAS usage indication of the selected EAS, where the AC establishes a connection with the selected EAS for an application service(s). Where the selection of the EAS by the EEC is done with the help of an application client (AC) of the UE.

In an example embodiment, the method further includes sending, by the EES, an EAS usage indication acknowledgment to the EEC, where the EAS usage indication acknowledgment includes a successful response, an identifier of the EES (EESID) and security credentials of the EES when EES has successfully processed the received indication; or, a failure response, or a cause of failure when the EES failed to process the received indication.

In an example embodiment, the EEC sends the EAS usage indication to the EES as part of another message sent from the EEC to the EES, such as an application context relocation (ACR) information subscription message, an EEC registration update message, or an EEC context message.

In an example embodiment, the ACR information subscription message or the EEC registration update message are sent by the EEC to the EES of the selected EAS, in response to selecting the EAS for application layer services.

In an example embodiment, the EEC context message is sent/used by a source EES when the EEC moves from the source EES to a target EES, and where the EEC context message includes information received from the EEC or the EAS.

In an example embodiment, the method includes receiving, by the EAS, a request from the AC of the UE for an application layer service, and the request includes the source Internet Protocol (IP) address of the UE, the EECID, and the UE ID. Further, the method includes receiving, by the EES, an EAS usage indication from the EAS, where the EAS usage indication includes the source IP address of the UE, the EECID, and the UE ID. Further, the method includes determining, by the EES, whether credentials of the EAS are valid. Further, the method includes storing, by the EES, the source IP address of the UE, the EECID, and the UE ID in response to determining that the credentials of the EAS are valid. Further, the method includes identifying, by the EES, the UE based on the received EAS usage indication. Further, the method includes reserving, by the EES, resource(s) to provide services to the EAS in relation to the identified UE. Further, the method includes sending, by the EES, the EAS usage indication acknowledgment to the EAS.

In an example embodiment, providing, by the EES, the service(s) to the EAS based on the stored plurality of parameters includes for example, performing at least one of, reserving resources such as compute resource or storage resource for the EAS, monitoring a location of the UE to provide assistance to the EAS for the ACR, or subscribing to the information related to the UE utilizing the 3GPP core network capability exposure application programming interfaces (APIs), etc.

Accordingly, embodiments herein disclose the EES for providing the service(s) to the EAS in the EDN. The EES includes a resource controller coupled with a processor and a memory. The resource controller is configured to receive the EAS usage indication from the Edge EEC of the UE, where the EAS usage indication comprises the plurality of parameters. Further, the resource controller is configured to determine whether credentials of the EEC are valid. Further, the resource controller is configured to store the plurality of parameters in response to determining that the credentials of the EEC are valid. Further, the resource controller is configured to provide the at least one service to the EAS based on the stored plurality of parameters.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

This method and system are illustrated in the accompanying drawings, throughout which like reference letters indicate corresponding parts in the various figures. The embodiments herein will be better understood from the following description with reference to the drawings, in which.

DETAILED DESCRIPTION

Figure 1:
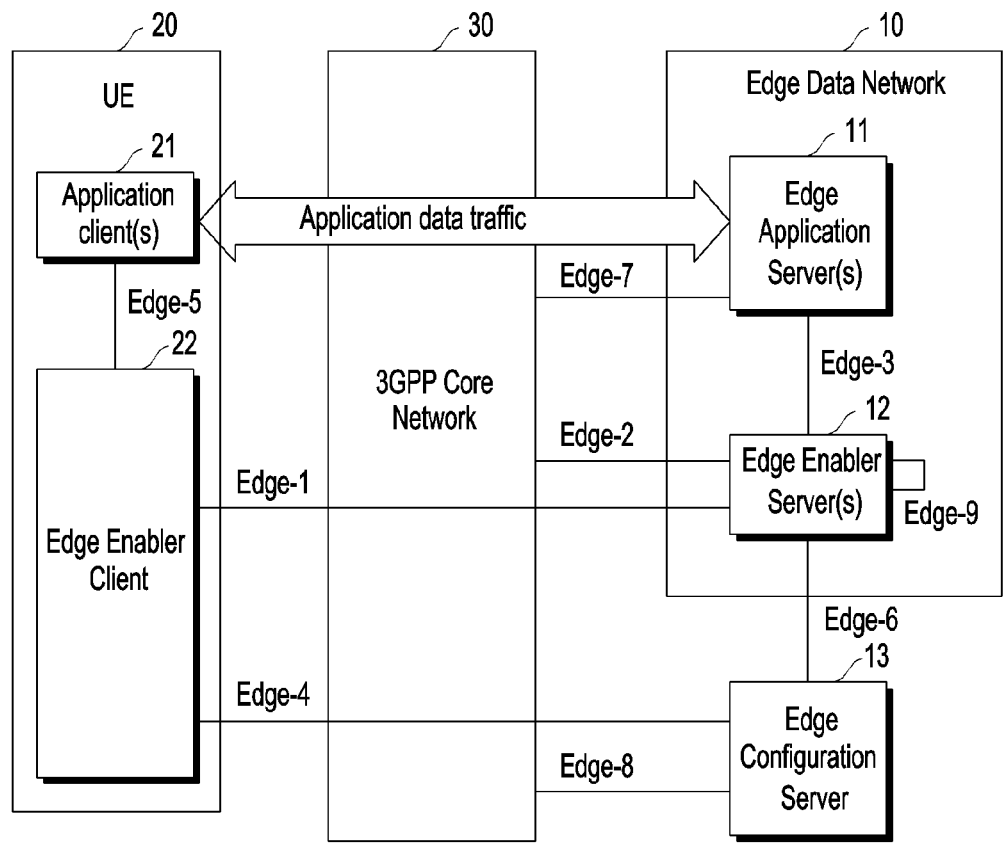
FIG. 1 illustrates an architecture of an edge computing system for enabling edge applications in 3rd generation partnership project (3GPP) networks, according to a prior art disclosed herein.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the present disclosure. Likewise, the blocks of the embodiments may be physically combined into more complex blocks without departing from the scope of the present disclosure.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings.

Accordingly, embodiments herein disclose a method for providing service(s) to an edge application server (EAS) in an edge data network (EDN). The method includes receiving, by an edge enabler server (EES), an EAS usage indication from an edge enabler client (EEC) of a user equipment (UE), where the EAS usage indication includes a plurality of parameters. Further, the method includes determining, by the EES, whether credentials of the EEC are valid. Further, the method includes storing, by the EES, the plurality of parameters in response to determining that the credentials of the EEC are valid. Further, the method includes providing, by the EES, service(s) to the EAS based on the stored plurality of parameters.

Accordingly, embodiments herein disclose the EES for providing the service(s) to the EAS in the EDN. The EES includes a resource controller coupled with a processor and a memory. The resource controller is configured to receive the EAS usage indication from the Edge EEC of the UE, where the EAS usage indication comprises the plurality of parameters. Further, the resource controller is configured to determine whether credentials of the EEC are valid. Further, the resource controller is configured to store the plurality of parameters in response to determining that the credentials of the EEC are valid. Further, the resource controller is configured to provide the at least one service to the EAS based on the stored plurality of parameters.

In an alternate embodiment, the EAS usage indication is provided by the EAS to the EES. In another embodiment, the EAS usage indication is provided by the source EES to the target EES as part of the EEC context, when the EEC moves from the source EES to the target EES.

FIG. 1 illustrates an existing general architecture for enabling edge applications in 3rd generation partnership project (3GPP) networks, as depicted in 3GPP technical specification (TS) 23.558. The ECS (13) is responsible for providing relevant configurations to the EEC (22) in the UE (20), such that the EEC (22) determines availability of an edge computing service and connect to the available edge enabler servers. This process is called service provisioning. Furthermore, the EES (12) is responsible for providing relevant configurations to the EEC (22) in the UE (20), such that the EEC (22) is able to determine availability of the EAS(s) (11) and enable an AC (21) to connect to the EAS(s) (11). This process is called an EAS discovery.

During the service provisioning, the EEC (22) may obtain the configuration of multiple EESs (12) and further do the EAS discovery on all or some of those EESs (12), thereby receiving details of multiple EASs (11). The EEC (22) selects a particular EAS (or a set of EASs) for the application service in a post-EAS discovery operation. The EEC (22) may take the help of the AC (21) for the selection. Once the EAS(s) is selected, the AC (21) establishes a connection(s) with the EAS(s) (11) and avails application service(s).

In this process, the EESs (12) are not informed if the EAS registered with the EESs (12) is selected by the EEC (22) or not. This creates a problem for the EESs (12) to determine whether it needs to provide the EAS(s) (11) any service in response to the recent EAS discovery request or not. The EES (12) may need to reserve some resources or may need to subscribe to the capabilities of a core network (i.e., 3GPP core network (30)). For example, a subscription is required to monitor and detect a need for application context relocation (ACR).

Unlike existing methods and systems, the provided method allows the EES to receive the EAS usage indication from the EEC of the UE and/or the EAS. The EES then reserves resources and makes appropriate arrangements (e.g., subscribing for CN capabilities or monitor UE for ACR) to provide support to the EAS based on the EAS usage indication. As a result, the resources are optimally utilized in an edge data network (EDN).

Unlike existing methods and systems, the provided method allows the EES to store a plurality of parameters (e.g., an identifier of the EEC (EECID), security credentials of the EEC, an identifier of the UE (UE ID), source Internet Protocol (IP) address of the UE, etc.) associated with the EAS usage indication in the EES when credentials of the EEC and/or the EAS and/or a source EES are valid.

Referring now to the drawings, and more particularly to FIGS. 2A through 7, there are shown preferred embodiments.

Figure 2A:
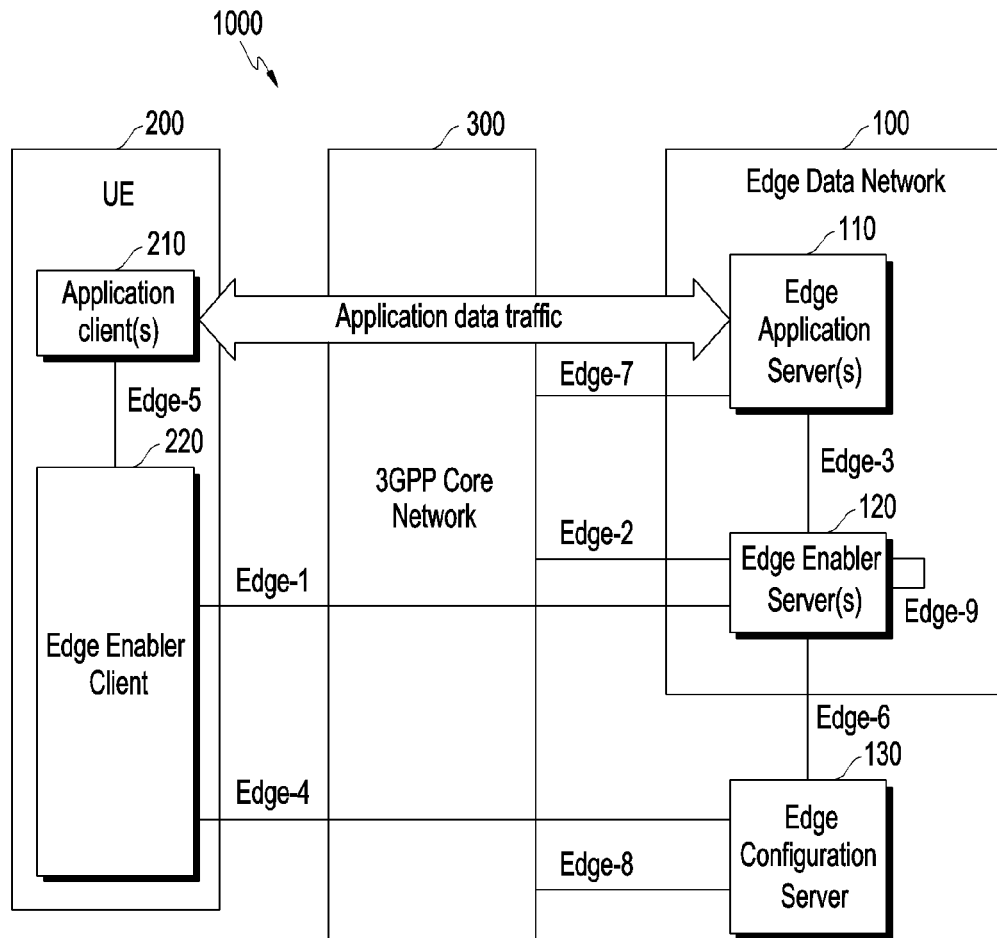
FIG. 2A illustrates a system block diagram for informing an edge enabler server(s) (EES) regarding usage of an edge application server(s) (EAS) in an edge data network (EDN), according to an embodiment as disclosed herein.

FIG. 2A illustrates a system (1000) block diagram for informing an Edge Enabler Server(s) (EES) (120) regarding usage of Edge Application Server(s) (EAS) (110) in an Edge Data Network (EDN) (100), according to an embodiment as disclosed herein.

The system (1000) includes a user equipment (200), a 3GPP core network (300), the EDN (100), and an edge configuration server (ECS) (130). The UE (200) can be, for example, but are not limited, to a smart phone, a smart watch, a tablet, an Internet of Things (IoT) device and a robotic device. The UE (200) includes an application client(s) (AC) (210) and an edge enabler client (EEC) (220). The EDN (100) includes the EAS (110) and the EES (120).

The EEC (220) determines availability of a plurality of EASs in the EDN (100) by using the ECS (130) and the EES (120). Further, the EEC (220) selects the EAS(s) (110) from the plurality of EASs by using the AC (210) of the UE (200). Once selected, the EEC (220) sends an EAS usage indication to the EES (120) where the selected EAS (110) is registered. The AC (210) establishes a connection with the selected EAS for an application service(s).

The EES (120) receives the EAS usage indication from the EEC (220) of the UE (200), where the EAS usage indication includes a plurality of parameters. The plurality of parameters includes an identifier of the EEC (220) (EECID), security credentials of the EEC (220), an identifier of the UE (200) (UE ID), or a list of EAS identifiers (EASIDs) which are being used by the AC (210) of the UE (200). The EEC (220) sends the EAS usage indication to the EES (120) by using a dedicated message or as part of another message, such as an application context relocation (ACR) information subscription message and/or an EEC registration update message and/or an EEC context message.

The EEC context message is sent/used by a source EES (120a) to a target EES (120b), and where the EEC context message comprises information received from the EEC (220) or the EAS (110).

Further, the EES (120) determines whether credentials of the EEC are valid. Further, the EES (120) stores the plurality of parameters in response to determining that the credentials of the EEC are valid. Further, the EES (120) provides service(s) to the EAS based on the stored plurality of parameters. Further, the EES (120) sends an EAS usage indication acknowledgment and/or an ACR information subscription response and/or an EEC registration response back to the EEC (220), where the message includes at least one of a successful response, an identifier of the EES (EESID) and security credentials of the EES (120) when the EES (120) has successfully processed the EAS usage indication, otherwise a failure response, and/or a cause of failure.

Further, the EAS (110) receives a request from the AC (210) of the UE (200) for an application layer service(s), and the request includes at least one of a source Internet Protocol (IP) address of the UE (200), the EECID, and the UE ID. Further, the EES (120) receives the EAS usage indication from the EAS, where the EAS usage indication includes at least one of the source IP address of the UE, the EECID, and the UE ID. Further, the EES (120) determines whether credentials of the EAS (110) are valid. Further, the EES (120) stores the source IP address of the UE (200), the EECID, and the UE ID in response to determining that the credentials of the EAS (110) are valid. Further, the EES (120) identifies the UE (200) based on the received EAS usage indication. Further, the EES (120) reserves a resource(s) for the EAS (110) in relation to the identified UE (200). Further, the EES (120) sends the EAS usage indication acknowledgment to the EAS (110).

Further, the EES (120), performing at least one of, reserves the at least one resource, wherein the at least one resource comprises at least one of a compute resource for the EAS (110) and storage resource for the EAS (110), monitors a location of the UE (200) to provide assistance to the EAS (110) for the ACR, subscribes to the information related to the UE (200) and utilizing 3rd generation partnership project (3GPP) core network (300) capability exposure application programming interfaces (APIs).

In an alternate embodiment, the source EES (120) sends the EAS usage indication to the target EES (120) as part of the EEC context. The EEC context message used by a source EES when the EEC (220) moves from the source EES to a target EES, and where the EEC context message comprises information received from the EEC (220) or the EAS (110).

Figure 2B:
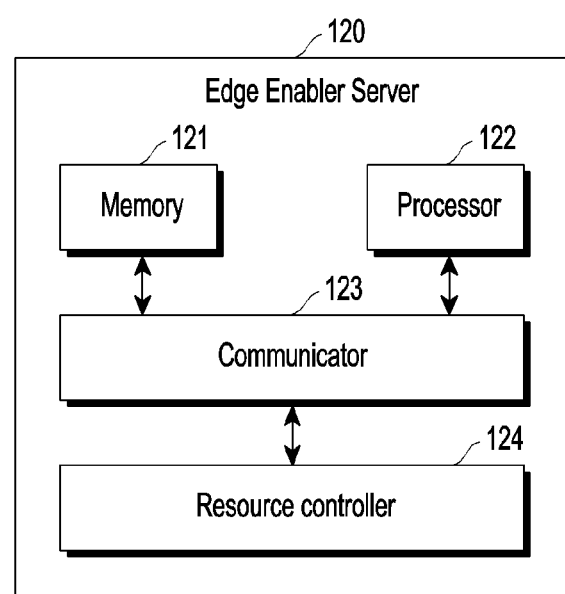
FIG. 2B illustrates a block diagram of the EES for providing service(s) to the EAS based on an EAS usage indication received from an edge enabler client (EEC) of a user equipment (UE) and/or the EAS in the EDN, according to an embodiment as disclosed herein.

FIG. 2B illustrates a block diagram of the EES (120) for providing service(s) to the EAS (110) based on the EAS usage indication received from the EEC (220) of the UE (200) and/or the EAS (110) and/or the source EES (120) in the EDN (100), according to an embodiment as disclosed herein.

In an embodiment, the EES (122) includes memory (121), a processor (122), a communicator (123), and a resource controller (124).

In an embodiment, the memory (121) is configured to store the plurality of parameters. The memory (121) stores instructions to be executed by the processor (122). The memory (121) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (121) may, in some examples, be considered a non-transitory storage medium. The term "non-transitory" may indicate that the storage medium is not embodied in a carrier wave or a propagated signal. However, the term "non-transitory" should not be interpreted that the memory (121) is non-movable. In some examples, the memory (121) can be configured to store larger amounts of information than the memory. In certain examples, a non-transitory storage medium may store data that can, over time, change (e.g., in random access memory (RAM) or cache). The memory (121) can be an internal storage unit or it can be an external storage unit of the EES (120), a cloud storage, or any other type of external storage.

The processor (122) communicates with the memory (121), the communicator (123), and the resource controller (124). The processor (122) is configured to execute instructions stored in the memory (121) and to perform various processes. The processor (122) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (123) is configured for communicating internally between internal hardware components and with external devices (e.g., the EAS (110), the UE (200), the ECS (130), etc.) via one or more networks (e.g., Radio technology). The communicator (123) includes an electronic circuit specific to a standard that enables wired or wireless communication.

The resource controller (124) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an example embodiment, the resource controller (124) receives the EAS usage indication from the EEC (220) of the UE (200), where the EAS usage indication includes the plurality of parameters. Further, the resource controller (124) determines whether credentials of the EEC (220) are valid. Further, the resource controller (124) stores the plurality of parameters in response to determining that the credentials of the EEC (220) are valid. Further, the resource controller (124) provides service(s) to the EAS (110) based on the stored plurality of parameters. Further, the resource controller (124) sends the EAS usage indication acknowledgment to the EEC (220) and/or the EAS (110).

In an alternate example embodiment, the resource controller (124) receives the EAS usage indication from the EAS (110), where the EAS usage indication includes at least one of the source IP address of the UE (200), the EECID, and the UE ID Further, the resource controller (124) determines whether credentials of the EAS (110) are valid. Further, the resource controller (124) stores the source IP address of the UE (200), the EECID, and the UE ID in response to determining that the credentials of the EAS (110) are valid. Further, the resource controller (124) identifies the UE (200) based on the received EAS usage indication. Further, the resource controller (124) reserves the resource(s) for the EAS (110) in relation to the identified UE (200).

Further, the resource controller (124) reserves the at least one resource, where the at least one resource comprises at least one of a compute resource for the EAS (110) and storage resource for the EAS (110). Further, the resource controller (124) monitors a location of the UE (200) to provide assistance to the EAS (110) for the ACR. Further, the resource controller (124) subscribes to the information related to the UE (200) and utilizing 3rd generation partnership project (3GPP) core network (300) capability exposure application programming interfaces (APIs).

In another alternate example embodiment, the resource controller (124) receives the EAS usage indication from the source EES (120), as part of the EEC context.

Although the FIG. 2B shows various hardware components of the EES (120) but it is to be understood that other embodiments are not limited thereon. In other embodiments, the EES (120) may include less or more number of components. Further, the labels or names of the components are used only for illustrative purpose and does not limit the scope of the present disclosure. One or more components can be combined together to perform same or substantially similar function to provide service(s) to the EAS (110) in the EDN (100).

Figure 3:
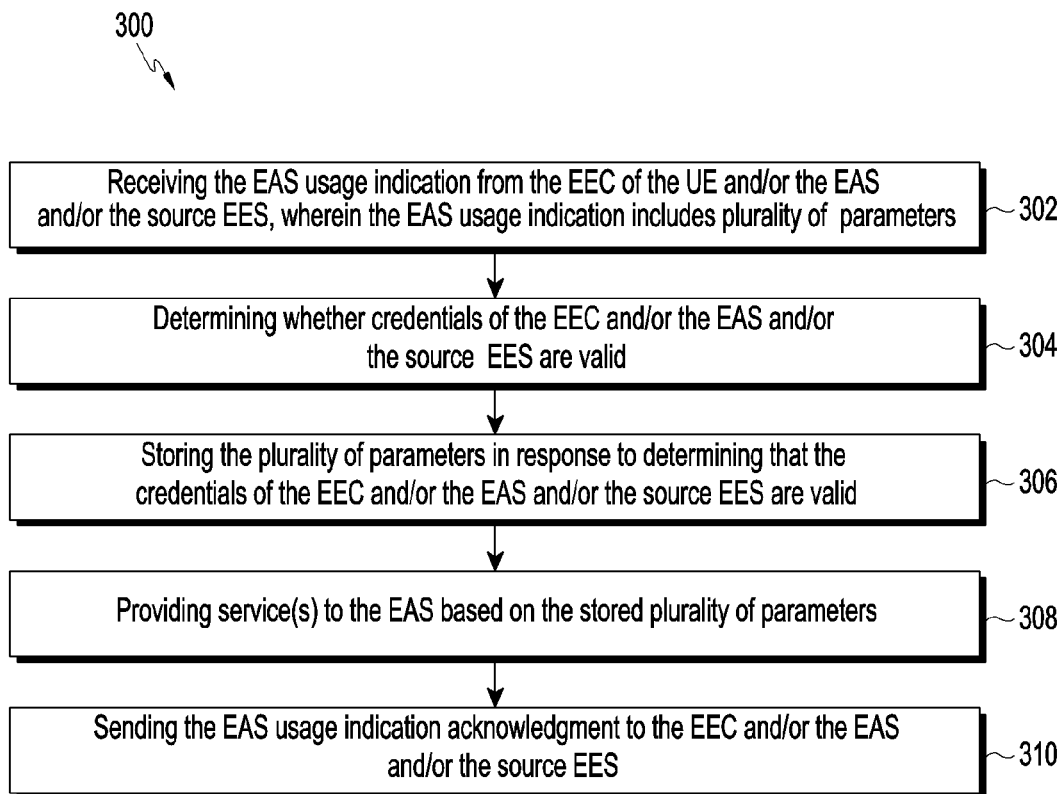
FIG. 3 is a flow diagram illustrating a method for providing the service(s) to the EAS in the EDN, according to an embodiment as disclosed herein.

FIG. 3 is a flow diagram (300) illustrating a method for providing service(s) to the EAS (110) in the EDN (100), according to an embodiment as disclosed herein. The steps (302-310) are performed by the EES (120).

At step 302, the method includes receiving the EAS usage indication from the EEC (220) of the UE (200) and/or the EAS (110), and/or the source EES (120), where the EAS usage indication includes the plurality of parameters. At step 304, the method includes determining whether the credentials of sender (i.e., EEC (220) and/or EAS (110), and/or the source EES (120)) are valid. At step 306, the method includes storing the plurality of parameters in response to determining that the credentials of the sender i.e., EEC (220) and/or EAS (110), and/or the source EES (120) are valid. At step 308, the method includes providing service(s) to the EAS (110) based on the stored plurality of parameters. At step 310, the method includes sending the EAS usage indication acknowledgment to the EEC (220) and/or the EAS (110) and/or the source EES.

In an alternate embodiment, the EAS usage indication is included as part of another message, such as the ACR information subscription request or the EEC registration message, when sent by the EEC (220), or the EEC context message when sent by the source EES (120a).

The various actions, acts, blocks, steps, or the like in the flow diagram (300) may be performed in the order presented, in a different order or simultaneously. Further, in some embodiments, some of the actions, acts, blocks, steps, or the like may be omitted, added, modified, skipped, or the like without departing from the scope of the present disclosure.

Figure 4:
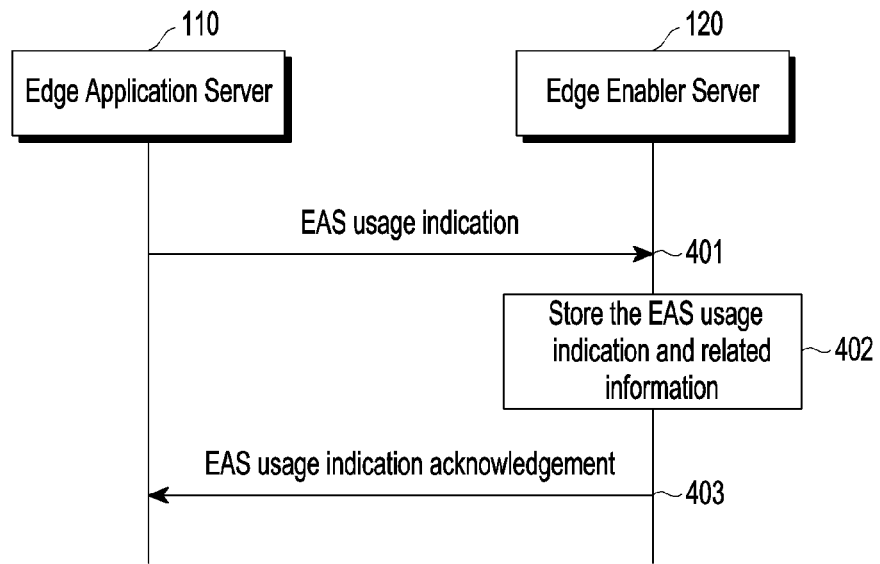
FIG. 4 is a sequence diagram illustrating a method in which the EAS provides the EAS usage indication to the EES, according to an embodiment as disclosed herein.

FIG. 4 is a sequence diagram illustrating a method in which the EAS (110) provides the EAS usage indication to the EES (120), according to an embodiment as disclosed herein.

At step 401, the EAS (110) sends the EAS usage indication to the EES (120), where the EAS usage indication includes the source IP address of the UE (200) available in a request of the AC (210) to the EAS (110), informing that a new AC (i.e., UE (200)) has connected with the EAS (110). In this scenario, where the AC (210) provides explicit identification of the UE (200) (e.g., UE ID) or the EEC (220) (e.g., EEC ID) to the EAS (110), it can be included as part of the EAS usage indication sent to the EES (120) by the EAS (110), saving the need of determining the UE by translating the IP address of the UE (200) to it identifier in step 402. At step 402, the EES (120) further uses the source IP address to identify the associated UE (200) and reserve the resources for providing services to the EAS (110) such as the UE's location monitoring, monitoring the user plane path, etc. At step 403, the EES (120) sends the EAS usage indication acknowledgement as an acknowledgment of the received indication from the EAS (110).

In an example embodiment, the EES (120) can also infer the usage by the UE (200) on receiving explicit requests for EES services by the EAS (110). For example, the UE monitoring requests to service continuity, the IP address to UE ID translation, etc.

In an example embodiment, the EAS (110) can also use the UE ID API to indicate to the EES (120) about the usage of the EAS (110) by the UE (200). This may also allow the EAS (110) to obtain the user s consent for the usage of a generic public subscription identifier (GPSI).

In an example embodiment, once the AC (210) has utilized the services of the EAS (110) and is not interested in further use, the EEC (220) of the UE (200) informs the EES (120) so that the EES (120) releases the reserved resources.

In an example embodiment, the EAS (110) informs the EES (120) once the service to the AC (210) has been fulfilled. The EAS (110) after providing the services to the AC (210) indicates to the EES (120) that the EES (120) is no longer needed to monitor the UE (200) for an EAS-specific service(s). This can be done using an explicit API exposed by the EES (120) towards the EAS (110).

Figure 5:
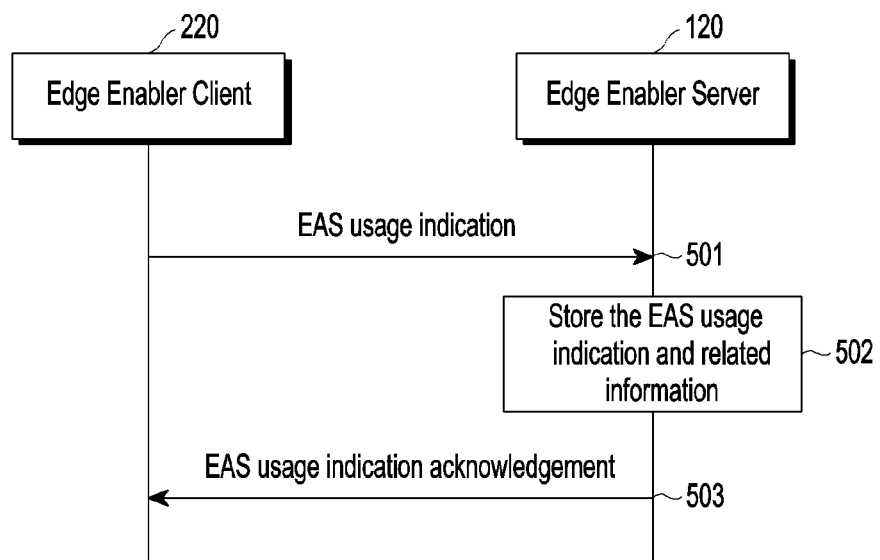
FIG. 5 is a sequence diagram illustrating a method in which the EEC provides the EAS usage indication to the EES, according to an embodiment as disclosed herein.

FIG. 5 is a sequence diagram illustrating a method in which the EEC (220) provides the EAS usage indication to the EES (120), according to an embodiment as disclosed herein.

In an example embodiment, after selecting the EAS (110) from a list of discovered EAS, the EEC (220) sends the explicit indication of usage of the EAS to the EES (120) from which the EEC (220) received the information of the selected EAS (110). The EES (120) then stores the information and reserve the resources for providing services to the EAS (110), for example, the UE's location monitoring, monitoring the user plane path, etc. The EES (120) may also subscribe to the core network-provided capabilities for the UE (200). The request from the EEC (220) providing the explicit indication of the usage of the EAS (110) may also include relevant details of the UE (200) or the user of the EAS (110). For example, the EEC (220) may include the UE identifiers and the user's consent for the usage of the UE identifiers by the EAS (110). The EES (120) stores this information to further provide the UE ID to the EAS (110) taking the user's consent into account.

Pre-condition: The EEC (220) has discovered and selected the EAS (110) to be used by the AC (210).

At step 501, the EEC (220) sends the EAS usage indication to the EES (120) at which the selected EAS (110) is registered. The EAS usage indication provides the EAS ID and the EAS endpoint of the selected EAS along with the EEC ID and its credentials. Further, the EAS usage indication includes the UE ID of the UE and related user's consent that can be used by the EES (120) to further provide services to the EAS (110), the EAS usage indication shown in Table 1.

TABLE 1

| EAS usage indication | | |
|---|---|---|
| Information element | Status | Description |
| EEC ID | M | Identifier of the EEC |
| Security credentials | M | Security credentials of the EEC. |

TABLE 1-continued

EAS usage indication

| Information element | Status | Description |
| --- | --- | --- |
| UE ID | O | Identifier of the UE (e.g., GPSI) |
| List of EASs | M | List of EAS identifiers that are being used by the ACs in the UE |
| >EAS ID | M | EAS identifier |
| >Related user consent | O | User's consent for use of the UE ID by the EAS. It can be a list explicitly defining the purposes for which the EAS can use the UE ID |

In an example embodiment, the UE ID can be a list of "O" UE identifiers. Further, each identifier can be associated with specific usage e.g., location.

At step 502, upon receiving the EAS usage indication, the EES (120) verifies the credentials of the EEC (220). If the credentials of the EEC (220) are valid, then the EES (120) stores the provided information (i.e., EAS usage indication, Table-1) and uses the information further to provide services to the EAS (110), for example, the EES (120) starts monitoring the UE's location or the user plane path to the EAS (110) providing services such as assistance in application context relocation.

At step 503, the EES (120) sends the EAS usage indication acknowledgement to the EEC (220), confirming receipt of the EAS usage indication, the EAS usage indication acknowledgement is shown in Table 2.

TABLE 2

EAS usage indication acknowledgment

| Information element | Status | Description |
| --- | --- | --- |
| Successful response | O | This indicates that the UE identifier request was successful. |
| >EES ID | M | Identifier of the EES |
| >Security credentials | M | Security credential of the EES |
| Failure response | O | This indicates that the UE identifier request failed. |
| >Cause | O | Indicates the cause of UE identifier request failure |

In an example embodiment, once the AC (210) has consumed the required services of the EAS (110), the AC (210) indicates to the EEC (220) which further intimates the EES (120) that the resources reserved and monitoring of the UE (200) can be released as the services of the EAS (110) are no longer be used. This indication can be sent to the EES (120) in explicit messages from the EEC (220), similar to the ones depicted above. The EES (120) can release the resources related to UEs usage of the EAS (110) upon receiving this explicit indication.

Figure 6:
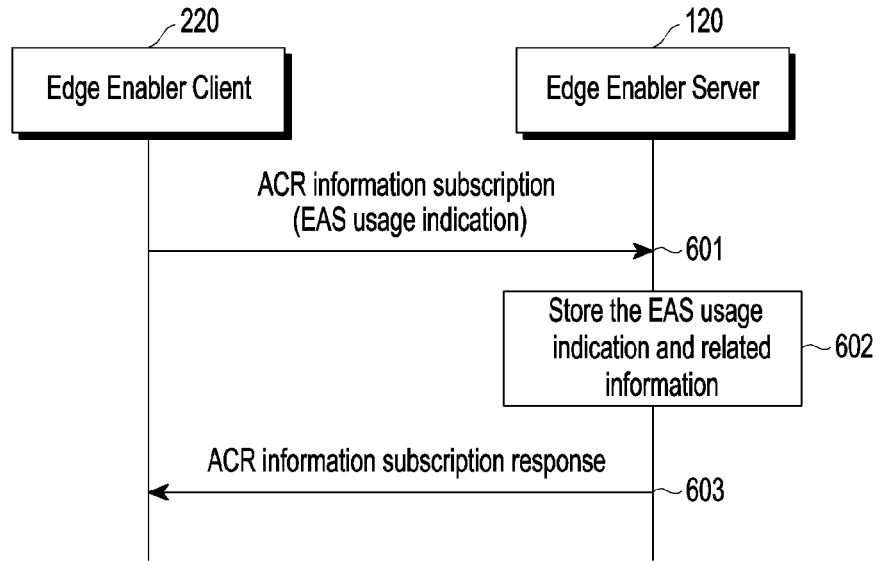
FIG. 6 is a sequence diagram illustrating a method in which the EEC provides the EAS usage indication to the EES as part of another message such as an ACR information subscription request, according to an embodiment as disclosed herein.

FIG. 6 is a sequence diagram illustrating a method in which the EEC (220) provides the EAS usage indication to the EES (120) as part of another message such as the ACR information subscription request, according to an embodiment as disclosed herein. The ACR information subscription allows the EES (120) to notify the EEC (220) about the events related to the ACR. Use of the ACR information subscription is just an example, any other message exchange between the EEC (220) and the EES (120), such as EEC registration request/response, can be utilized for this purpose.

Pre-condition: The EEC (220) has discovered and selected the EAS (110) to be used by the AC (210).

At step 601, the EEC (220) sends a request to the EES (120), such as an ACR information subscription (i.e., ACR information subscription) or an EEC registration update message to the EES (120) at which the selected EAS (110) is registered. The request from the EEC (220) provides the EAS ID and the EAS endpoint of the selected EAS (110) along with the EEC ID and the credentials of the EEC (220). Further, the request may include the UE ID of the UE and related user's consent that can be used by the EES (120) to further provide services to the EAS (110).

At step 602, upon receiving the request, the EES (120) verifies the credentials of the EEC (220). If the credentials of the EEC (220) are valid, then the EES (120) stores the provided information and uses it to further provide services to the EAS (110). For example, the EES (120) starts monitoring the UE's location or the user plane path to the EAS (110), providing services such as assistance in application context relocation. At step 603, the EES (120) sends an ACR information subscription response to the EEC (220), confirming a receipt of the request.

In an example embodiment, the EEC (220) provides similar indications of usage completion to the EES (120) as part of other messages such as the EEC registration update, or in cases where applicable, an EEC de-registration message. The EES (120) releases the resources related to UEs usage of the EAS (110) upon receiving this indication as part of other messages between the EEC (220) and the EES (120).

Figure 7:
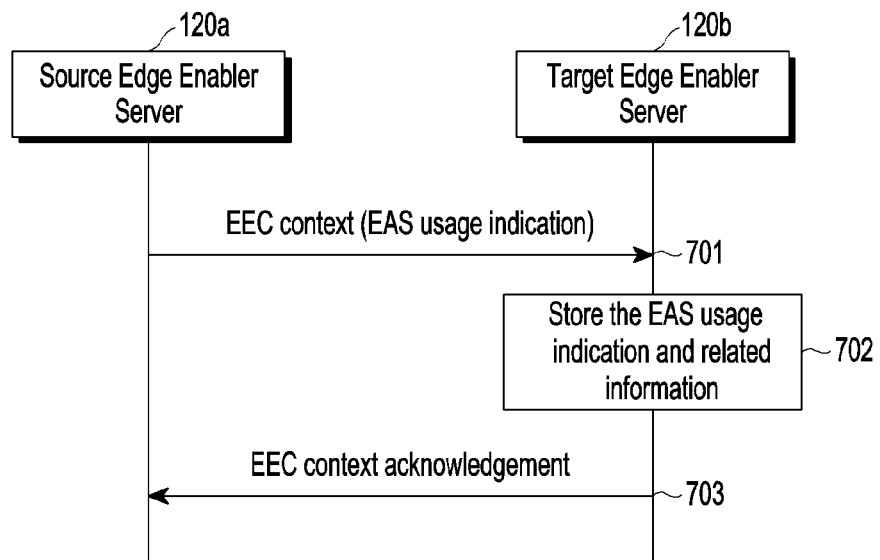
FIG. 7 is a sequence diagram illustrating a method in which a source EES provides the EAS usage indication to a target EES as part of the EEC context, according to an embodiment as disclosed herein.

FIG. 7 is a sequence diagram illustrating a method in which a source EES (120a) provides the EAS usage indication to a target EES (120b) using the EEC context i.e., the information stored at the source EES (120a) in relation to the EEC (220), according to an embodiment as disclosed herein.

Pre-condition: The EEC (220) is moving or has moved from one EES, called the source EES (120a) to another EES (i.e., target EES (120b)). The EEC (220) or the EAS (110) has provided the EAS usage indication to the source EES (120a).

While sharing the EEC context information, the source EES (120a) includes this information (received earlier from the EEC (220) or the EAS (110)) as part of the EEC context sent to the target EES (120b).

At step 701, the source EES (120a) sends the EEC context to the target EES (120b) which includes the details of the EASs (110) being used by the UE (200), registered at the source EES (120a). Further, the request may include the UE ID of the UE and related user's consent that can be used by the target EES (120b) to further provide services to the EAS (110).

At step 702, upon receiving the EEC context, the target EES (120b) verifies the credentials of the source EES (120a). If the credentials of the source EES (120a) are valid, then the target EES (120b) stores the provided information and uses the information further to provide services to the EAS (110). For example, the target EES (120b) starts monitoring the UE's location or the user plane path to the EAS (110) to provide services such as assistance in the application context relocation. At step 703, the target EES (120b) sends an EEC context acknowledgement to the source EES (120a), confirming receipt of the EEC context.

In an example embodiment, the source EES (120a) can also infer that the usage of the EAS (110) is complete based on its involvement in the application context relocation process. The source EES (120a) releases the resources related to UEs usage of the EAS (110) once the application context relocation process is complete.

In an alternate embodiment, the target EES (120b) can also infer that the usage of the EAS (110) based on its involvement in the application context relocation process. The target EES (120b) upon being involved in the ACR process, reserves the resources required to provide services to the EAS (110), such as monitoring UE's location, monitoring user plane path etc.

Figure 8:
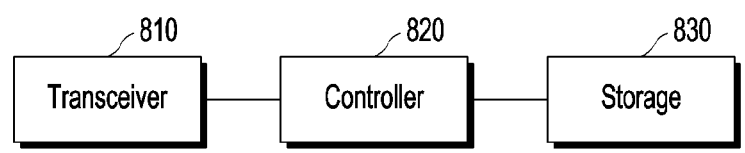
FIG. 8 is a block diagram of first electronic device according to an embodiment of the disclosure.

FIG. 8 is a block diagram of first electronic device according to an embodiment of the disclosure. The first electronic device may correspond to, for example, the UE, the AC(s) in the UE or the EEC in the UE, as shown in FIGS. 1-7.

Referring to FIG. 8, the first electronic device may include a transceiver 810, a controller 820, and storage 830. In the present disclosure, the controller 820 may include a circuit, an ASIC, or at least one processor.

The transceiver 810 may transmit and receive signals to and from another electronic device.

The controller 820 may control the overall operation of the first electronic device according to an embodiment. For example, the controller 820 may control the signal flow to perform the operations in FIGS. 1-7 described above. For example, the control unit 820 may perform at least one operation for the EAS usage indication.

The storage 830 may store at least one of information exchanged through the transceiver 810 and information generated by the controller 830.

Figure 9:
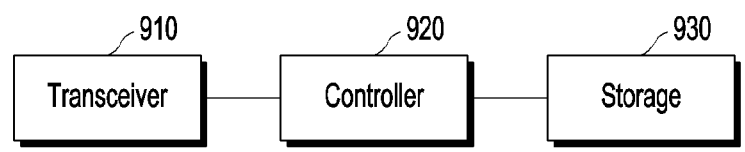
FIG. 9 is a block diagram of a second electronic device according to an embodiment of the disclosure.

FIG. 9 is a block diagram of a second electronic device according to an embodiment of the disclosure. The second electronic device may correspond to, for example, the EAS(s), the EES(s) or the ECS(s) in FIGS. 1-7.

Referring to FIG. 9, the second electronic device may include a transceiver 910, a controller 920, and storage 930. In the present disclosure, the controller 920 may include a circuit, an ASIC, or at least one processor.

The transceiver 910 may transmit and receive signals to and from another electronic device.

The controller 920 may control the overall operation of the second electronic device according to an embodiment. For example, the controller 920 may control the signal flow to perform the operations in FIGS. 1-7 described above. For example, the control unit 920 may perform at least one operation for the EAS usage indication.

The storage 930 may store at least one of information exchanged through the transceiver 910 and information generated by the controller 930.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by an edge enabler server (EES) in an edge data network (EDN), the method comprises:
   receiving, from an edge enabler client (EEC) of a user equipment (UE), a message for an edge application server (EAS) usage indication, the message being associated with an application context relocation (ACR), wherein the message comprises an identifier (ID) of an EAS that is selected by the EEC, the selected EAS being one of at least one discovered EAS and used by an application client (AC) of the UE;
   identifying the ID of the selected EAS; and
   providing a service associated with the ACR to the selected EAS having the ID of the selected EAS.

2. The method of claim 1, further comprising:
   determining whether credentials of the EEC are valid; and
   storing at least one parameter included in the message based on a determination that the credentials of the EEC are valid.

3. The method of claim 1, wherein the message further comprises at least one of an ID of the EEC, security credentials of the EEC, or an ID of the UE.

4. The method of claim 1,
   wherein the at least one discovered EAS is, by the EEC, discovered by using an edge configuration server (ECS) and the EES, and
   wherein the AC of the UE establishes a connection with the selected EAS for the service.

5. The method of claim 1, wherein the selected EAS is selected based on a support of an application client (AC) of the UE.

6. The method of claim 1, further comprising:
   sending a second message for an EAS usage indication acknowledgment to the EEC, wherein the second message comprises at least one of a successful response, an ID of the EES (EESID), security credentials of the EES, a failure response, or a cause of failure.

7. The method of claim 1, wherein the message is an application context relocation (ACR) information subscription message, an EEC registration update message, or an EEC context message.

8. The method of claim 1, wherein providing the service associated with the ACR to the selected EAS comprises at least one of:
   reserving at least one resource, the at least one resource comprising at least one of a compute resource for the EAS or storage resource for the EAS;
   monitoring a location of the UE to provide assistance to the EAS for the ACR; or
   subscribing to information associated with the UE and utilizing 3rd generation partnership project (3GPP) core network capability exposure application programming interfaces (APIs).

9. An edge enabler server (EES) in an edge data network (EDN), the EES comprising:
   a memory;
   a transceiver; and
   a controller, operably connected to the memory and the transceiver, configured to:
   receive, from an edge enabler client (EEC) of a user equipment (UE), a message for an edge application server (EAS) usage indication, the message being associated with an application context relocation (ACR), wherein the message comprises an identifier (ID) of an EAS that is selected by the EEC, the selected EAS being one of at least one discovered EAS and used by an application client (AC) of the UE, identify the ID of the selected EAS, and provide a service associated with the ACR to the selected EAS having the ID of the selected EAS.

10. The EES of claim 9, wherein the controller is further configured to:

determine whether credentials of the EEC are valid; and store at least one parameter included in the message based on a determination that the credentials of the EEC are valid.

11. The EES of claim 9, wherein the message further comprises at least one of an ID of the EEC, security credentials of the EEC, or an ID of the UE.

12. The EES of claim 9, wherein the controller is further configured to:

send a second message for an EAS usage indication acknowledgment to the EEC, the second message comprising at least one of a successful response, an ID of the EES (EESID), security credentials of the EES, a failure response, or a cause of failure.

13. The EES of claim 9, wherein the message is an application context relocation (ACR) information subscription message, an EEC registration update message, or an EEC context message.

14. The EES of claim 9, wherein providing the service associated with the ACR to the selected EAS comprises at least one of:

reserving at least one resource, the at least one resource comprising at least one of a compute resource for the EAS or storage resource for the EAS;

monitoring a location of the UE to provide assistance to the EAS for the ACR; or subscribing to information associated with the UE and utilizing 3rd generation partnership project (3GPP) core network capability exposure application programming interfaces (APIs).

* * * * *